United States Patent
Soga

(10) Patent No.: US 9,965,473 B2
(45) Date of Patent: May 8, 2018

(54) SYSTEM, INFORMATION PROCESSING APPARATUS, METHOD FOR CONTROLLING THE SAME, AND NON-TRANSITORY COMPUTER-READABLE MEDIUM

(71) Applicant: CANON KABUSHIKI KAISHA, Tokyo (JP)

(72) Inventor: Masaya Soga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 546 days.

(21) Appl. No.: 14/332,846

(22) Filed: Jul. 16, 2014

(65) Prior Publication Data
US 2015/0032693 A1 Jan. 29, 2015

(30) Foreign Application Priority Data

Jul. 25, 2013 (JP) ................................. 2013-154960

(51) Int. Cl.
*G06F 17/30* (2006.01)

(52) U.S. Cl.
CPC ...... *G06F 17/30011* (2013.01); *G06F 17/303* (2013.01)

(58) Field of Classification Search
CPC .......................... G06F 17/303; G06F 17/30011
See application file for complete search history.

(56) References Cited

U.S. PATENT DOCUMENTS

| | | | | |
|---|---|---|---|---|
| 5,720,026 A | * | 2/1998 | Uemura | G06F 11/1451 707/999.202 |
| 6,269,382 B1 | * | 7/2001 | Cabrera | G06F 17/30082 |
| 7,103,740 B1 | * | 9/2006 | Colgrove | G06F 3/0605 707/999.202 |
| 8,392,370 B1 | * | 3/2013 | Whitney | G06F 3/067 707/640 |
| 9,292,547 B1 | * | 3/2016 | Schunicht | G06F 17/303 |

(Continued)

FOREIGN PATENT DOCUMENTS

| | | |
|---|---|---|
| JP | 2004/139217 A | 5/2004 |
| JP | 2009/230586 A | 10/2009 |

(Continued)

OTHER PUBLICATIONS

Japanese office action issued in corresponding application No. 2013154960 dated May 8, 2017.

(Continued)

*Primary Examiner* — Shiow-Jy Fan
(74) *Attorney, Agent, or Firm* — Carter, DeLuca, Farrell & Schmidt, LLP

(57) ABSTRACT

A system in which data stored in a first information processing apparatus is migrated to a second information processing apparatus, wherein the first information processing apparatus comprises: an export unit configured to export migration target data that is stored in a storing unit; and a recording unit configured to record time information indicating the time of exporting performed by the export unit, and the export unit furthermore compares the time information and information regarding an update date of the data stored in the storing unit and exports data updated at or subsequent to the time indicated by the time information as a difference migration target.

8 Claims, 14 Drawing Sheets

(56) References Cited

U.S. PATENT DOCUMENTS

| | | | |
|---|---|---|---|
| 2003/0028555 A1* | 2/2003 | Young | G06F 17/303 |
| 2004/0122865 A1* | 6/2004 | Stahl | G06F 17/303 |
| 2004/0139129 A1* | 7/2004 | Okuyama | G06F 17/303 |
| 2005/0051621 A1* | 3/2005 | Wong | G07C 9/00309 |
| | | | 235/382.5 |
| 2006/0074847 A1* | 4/2006 | Yatabe | G06F 17/30581 |
| 2007/0136353 A1* | 6/2007 | Hsiao | G06F 17/30914 |
| 2011/0029504 A1* | 2/2011 | King | G06F 17/30011 |
| | | | 707/709 |
| 2013/0159651 A1* | 6/2013 | Eguchi | G06F 3/061 |
| | | | 711/162 |
| 2013/0173547 A1* | 7/2013 | Cline | G06F 17/303 |
| | | | 707/638 |

FOREIGN PATENT DOCUMENTS

| | | |
|---|---|---|
| JP | 2011-095997 A | 5/2011 |
| JP | 2011-134269 A | 7/2011 |
| WO | 2007/052531 A1 | 5/2007 |
| WO | 2012/033110 A1 | 3/2012 |

OTHER PUBLICATIONS

Japanese Office Action issued in corresponding Japanese application No. 2013154960 dated Jul. 14, 2017.

* cited by examiner

FIG. 4

| DOCUMENT ID | DOCUMENT NAME | FILE FORMAT | STORAGE LOCATION |
|---|---|---|---|
| D001 | A | .pdf | /folder1 |
| D002 | B | .pdf | /folder1 |
| D003 | C | .pdf | /folder1 |

FIG. 5

| DOCUMENT ID (501) | PROPERTY NAME (502) | PROPERTY VALUE (503) | |
|---|---|---|---|
| D001 | CREATION TIME | 2012/11/01 11:00 | ~504 |
| D001 | CREATED BY | Administrator | ~505 |
| D001 | UPDATE TIME | 2012/11/07 7:00 | ~506 |
| D001 | LAST UPDATED BY | User03 | ~507 |
| D001 | INDEX | Text | ~508 |
| D002 | CREATION TIME | 2012/11/21 12:00 | ~509 |
| D002 | CREATED BY | Administrator | ~510 |
| D002 | UPDATE TIME | 2012/11/25 9:09 | ~511 |
| D002 | LAST UPDATED BY | User01 | ~512 |
| D002 | INDEX | Text2 | ~513 |
| D003 | CREATION TIME | 2012/12/02 18:12 | ~514 |
| D003 | CREATED BY | Administrator | ~515 |
| D003 | UPDATE TIME | 2012/12/13 12:02 | ~516 |
| D003 | LAST UPDATED BY | User02 | ~517 |
| D003 | INDEX | Text3 | ~518 |

FIG. 7

```
<?xml version="1.0" encoding="UTF-8" ?>
<Information>
  <ServerInfo>Document Management Server</ServerInfo>          — 602
  <Folder ID="1" Paht="/folder1">
    <Document ID="D001" name="A.pdf" >
      <Property name="CREATION TIME">2012/11/01</Property>
      <Property name="CREATED BY">Administrator</Property>              603
      <Property name="LAST UPDATE TIME">2012/12/07</Property>
      <Property name="LAST UPDATED BY">User03</Property>
      <Property name="INDEX">Text</Property>
    </Document>
    ...
  </Folder>

</Information>
```

| OPERATION | OPERATION TIME | DOCUMENT ID | |
|---|---|---|---|
| UPDATE | 2012/12/13 12:02 | D003 | ~704 |
| MOVE | 2012/12/13 13:00 | D004 | ~705 |
| DELETE | 2012/12/13 14:00 | D005 | ~706 |
| VIEW | 2012/12/13 16:00 | D006 | ~707 |

Columns: 701, 702, 703

SYSTEM, INFORMATION PROCESSING APPARATUS, METHOD FOR CONTROLLING THE SAME, AND NON-TRANSITORY COMPUTER-READABLE MEDIUM

BACKGROUND OF THE INVENTION

Field of the Invention

The present invention relates to a system, an information processing apparatus, a method for controlling the same, and a non-transitory computer-readable medium, and in particular relates to a technique for data migration between apparatuses.

Description of the Related Art

In document management systems that use a database, the capacity of a storage disk used by the database increases in accordance with the operation of the database. Also, in the case of switching the document management system to a new and different document management system, data stored in the database of the old document management system needs to be migrated to the database of the new document management system. However, the more data that is stored in the database of the old document management system, the more time it takes to migrate the data. The document management system cannot be used during migration, and if migration takes a long time, there is a possibility that business operations will be obstructed.

Conventionally, a method has been proposed in which difference information with respect to data between a migration source and a migration destination is created and migrated (see Japanese Patent Laid-Open No. 2011-134269, and the like). With Japanese Patent Laid-Open No. 2011-134269, the user uses an old document management system, which is the migration source, while the data is being migrated to a new document migration system, which is the migration destination. Then, after the first instance of migration is completed, migration of data registered in the old document management system during the first instance of migration is performed as the second instance of migration. At this time, the targets that are to be migrated in the second instance of migration are narrowed down using difference information created by obtaining the difference between data registered in the migration source and data registered in the migration destination. This shortens the migration time for the second instance of migration, in which data registered by the old document management system during the first instance of migration is used as the target.

With Japanese Patent Laid-Open No. 2011-134269, the difference information needs to be created by obtaining information from both the migration source environment and the migration destination environment. For this reason, there are problems in that obtaining the information is time-consuming, and if the migration to the migration destination environment is not complete, the information from the migration destination environment cannot be obtained and the difference information cannot be created. Also, if there is a large amount of data to be obtained from the respective document management systems, there is a problem in that processing for obtaining the information and processing for creating the difference information based on the information take time, and as a result, the migration time becomes longer.

SUMMARY OF THE INVENTION

According to one aspect of the present invention, there is provided a system in which data stored in a first information processing apparatus is migrated to a second information processing apparatus, wherein the first information processing apparatus comprises: an export unit configured to export migration target data that is stored in a storing unit; and a recording unit configured to record time information indicating the time of exporting performed by the export unit, and the export unit furthermore compares the time information and information regarding an update date of the data stored in the storing unit and exports data updated at or subsequent to the time indicated by the time information as a difference migration target.

According to another aspect of the present invention, there is provided a system in which data stored in a first information processing apparatus is migrated to a second information processing apparatus, wherein the first information processing apparatus comprises: an export unit configured to export migration target data that is stored in a storing unit, and the export unit performs exporting with the inclusion of information indicating, among the data stored in the storing unit, data that is to be imported with priority to the second information processing apparatus.

According to another aspect of the present invention, there is provided an information processing apparatus, comprising: an export unit configured to export migration target data that is stored in a storing unit; and a recording unit configured to record time information indicating the time of exporting performed by the export unit, wherein the export unit furthermore compares the time information and information regarding an update date of the data stored in the storing unit and exports data updated at or subsequent to the time indicated by the time information as a difference migration target.

According to another aspect of the present invention, there is provided an information processing apparatus, comprising: an export unit configured to export migration target data stored in a storing unit from the storing unit, wherein the export unit performs exporting with the inclusion of information indicating, among the data stored in the storing unit, data that is to be imported with priority to an apparatus that is a migration destination.

According to another aspect of the present invention, there is provided a method for controlling an information processing apparatus, the method comprising: an exporting step of exporting migration target data that is stored in a storing unit; and a recording step of recording time information indicating the time at which exporting was performed in the exporting step, wherein in the exporting step, the time information and the information regarding an update date of the data stored in the storing unit are compared, and data that was updated at or subsequent to the time indicated by the time information is exported as a difference migration target.

According to another aspect of the present invention, there is provided a method for controlling an information processing apparatus, the method comprising: an exporting step of exporting migration target data that is stored in a storing unit, wherein in the exporting step, exporting is performed with the inclusion of information that indicates, among the data stored in the storing unit, data that is to be imported with priority to an information processing apparatus that is a migration destination.

According to another aspect of the present invention, there is provided a non-transitory computer-readable medium storing a program for causing a computer to function as: an export unit configured to export migration target data that is stored in a storing unit; and a recording unit configured to record time information indicating the time of exporting performed by the export unit, wherein the export unit furthermore compares the time information and information regarding an update date of the data stored in the storing unit, and exports data updated at or subsequent to the time indicated by the time information as a difference migration target.

According to another aspect of the present invention, there is provided a non-transitory computer-readable medium storing a program for causing a computer to function as: an export unit configured to export migration target data that is stored in a storing unit, wherein the export unit performs exporting with the inclusion of information indicating, among the data stored in the storing unit, data that is to be imported with priority to an information processing apparatus that is a migration destination.

According to the present invention, it is possible to reduce the amount of time needed for migration in data migration between apparatuses and to improve user-friendliness.

Further features of the present invention will become apparent from the following description of exemplary embodiments with reference to the attached drawings.

BRIEF DESCRIPTION OF THE DRAWINGS

FIG. 4 is a diagram showing an example of a data structure in document management for a document management server.

FIG. 5 is a diagram showing an example of a data structure in document property management for a document management server.

FIG. 7 is a diagram showing an example of the data structure of export data according to the first embodiment.

FIG. 10 is a diagram showing an example of an operation history of the old document management server according to the first embodiment.

DESCRIPTION OF THE EMBODIMENTS

Hereinafter, embodiments of the present invention will be described with reference to the drawings.

First Embodiment

A first embodiment of the present invention will be described below.

Overall Configuration Including Document Management Server

Figure 1:
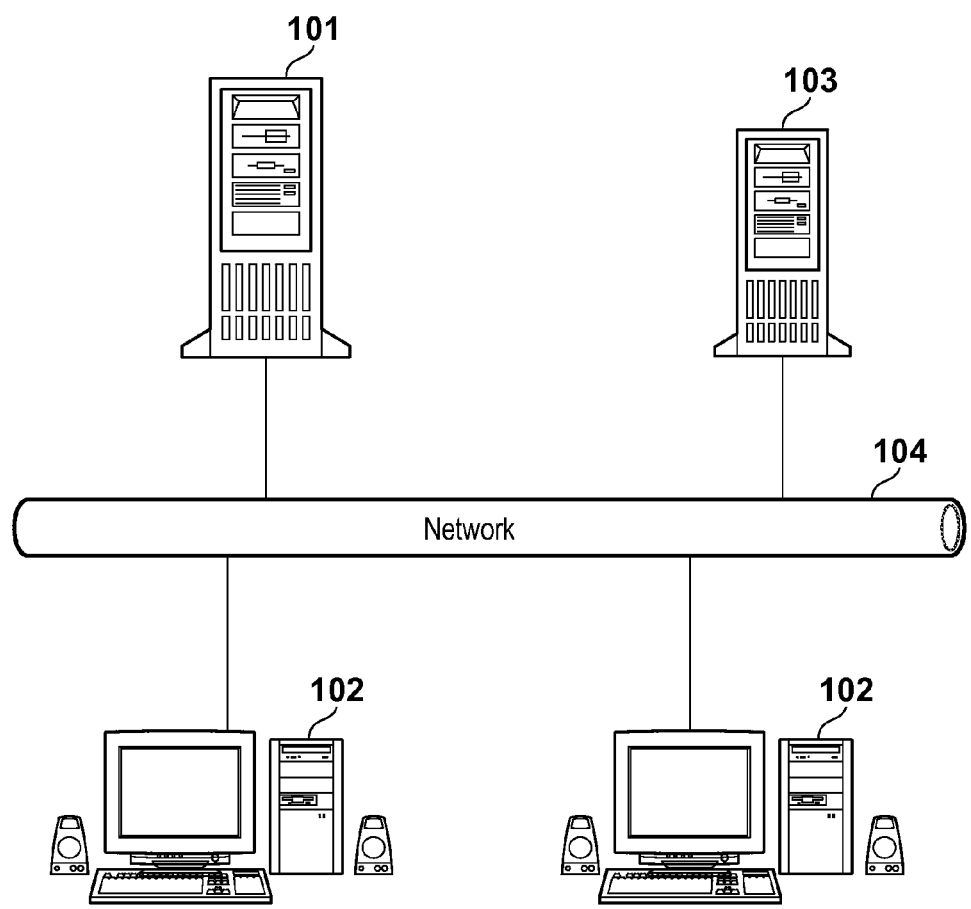
FIG. 1 is a block diagram showing an overall configuration of devices in a system.

A diagram of the overall configuration of a system including a document management server of the present embodiment will be described below with reference to the block diagram shown in FIG. 1. The system according to the present embodiment includes a document management server 101, a client apparatus 102, an old document management server 103, and a network 104.

The document management server 101 is an information processing apparatus that includes a function of managing documents, and provides managed document information and files in response to a request from the client apparatus 102. The present embodiment will describe processing at the time of migrating data from the old document management server 103 (first information processing apparatus) to the document management server 101 (second information processing apparatus). That is to say, the document management server 101 is the migration destination in the data migration. Also, although the present embodiment gives a description using document data as an example of data that is handled, figure (image) data, audio data, or the like, for example may be handled as well. The client apparatus 102 functions as a terminal for performing display of the document information stored in the document management server 101 and the old document management server 103, as well as performing operations with respect thereto. Note that the present invention is not particularly limited to having one client apparatus 102 in the network 104, and it is possible to have multiple client apparatuses 102 and the client apparatuses 102 may be configured by devices with different capabilities and configurations.

The old document management server 103 includes a function of managing documents similarly to the document management server 101, but the management system is different from that of the document management server 101. In the present embodiment, the old document management server 103 is the migration source for document data that is to be migrated to the document management server 101.

The network 104 is a network that makes it possible for the document management server 101, the client apparatus 102, and the old document management server 103 to perform mutual two-way communication. The network 104 is realized in a form such as a LAN (Local Area Network), a WAN (Wide Area Network), or the Internet, and may be wired or wireless.

Configuration of Document Management Server

The document management server 101 is a personal computer for a server and is configured by hardware such as a CPU, a RAM, a ROM, an HDD, and a network interface card (referred to below as "NIC"). Also, the document management server 101 is connected to operational units such as an external or internal display, a keyboard, and a mouse, and thereby performs input/output with respect to a user. The present embodiment describes the document management server 101 and the old document management server 103 as having the same hardware configurations and functional configurations.

Figure 2:
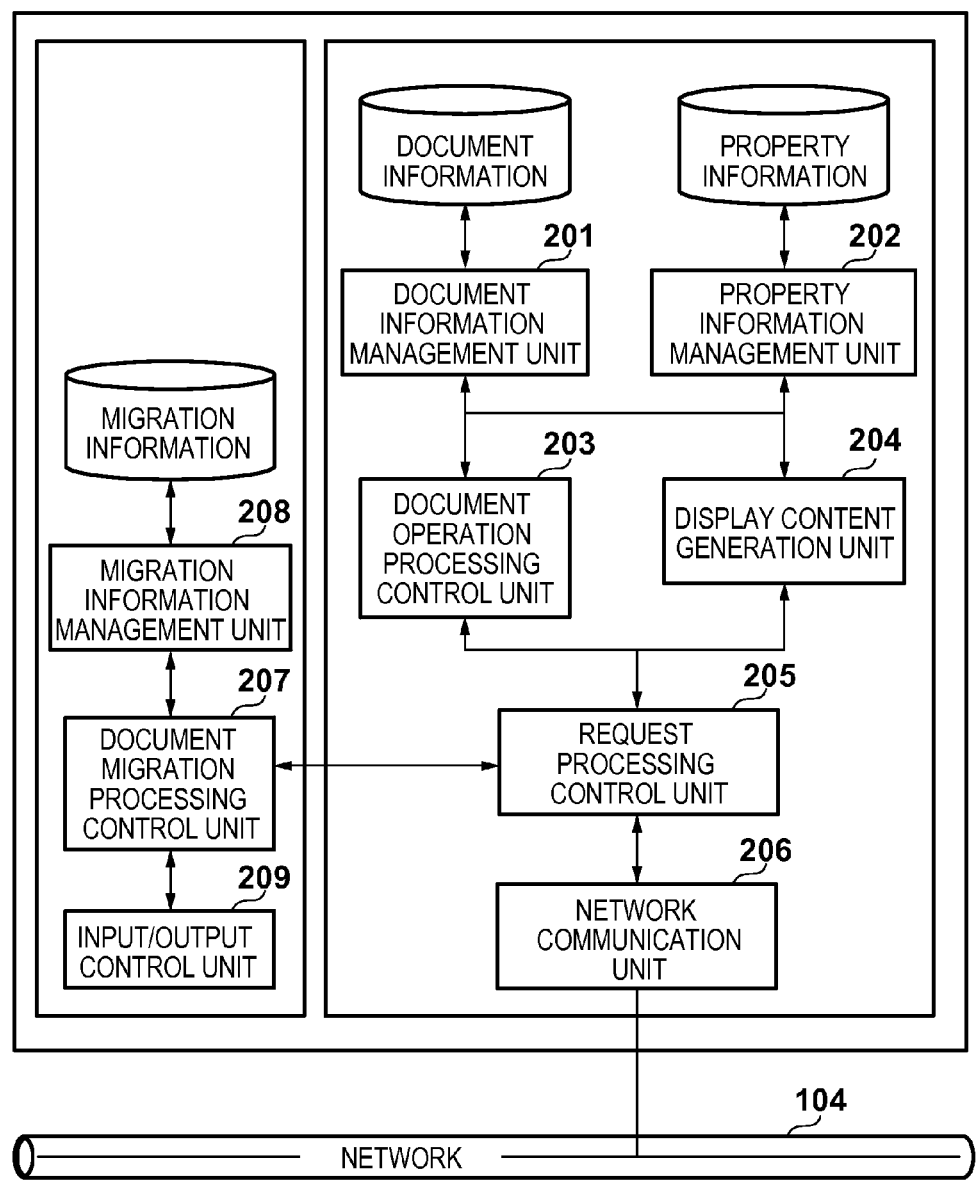
FIG. 2 is a diagram showing a functional configuration for a document management server.

The functional configuration of the document management server 101 and the old document management server 103 will be described below with reference to FIG. 2. The units shown in FIG. 2 are realized by a program being read out from an HDD or the like that is a storage unit to the RAM and executed by a CPU.

A document information management unit 201 performs input/output processing of document information (folder and file information). Also, the document information management unit 201 stores document information in a storage region such as a RAM or an HDD. A property information management unit 202 performs input/output of document property information. Also, the property information management unit 202 stores property information in a storage region. A document operation processing control unit 203 performs control of processing for document/folder operations requested by the client apparatus 102. The document operation processing control unit 203 obtains various types of information, mainly via the document information management unit 201 and the property information management unit 202, and performs processing.

A display content generation unit 204 performs processing for generating display content with respect to the result of processing performed by the document operation processing control unit 203. A request processing control unit 205 receives a request from the client apparatus 102 via a network communication unit 206 and performs control of processing in response to all requests. The request processing control unit 205 requests processing to the document operation processing control unit 203 according to the content of the received request.

The network communication unit 206 notifies the request processing control unit 205 of requests received from the client apparatus 102 and responds to the processing request sources with the result of the processing executed in response to the request. The network communication unit 206 is realized by the NIC of the document management server 101 and is connected to the network 104.

A document migration processing control unit 207 performs control of document migration processing. The document migration processing control unit 207 uses the document operation processing control unit 203 via the request processing control unit 205. The document migration processing control unit 207 manages information regarding the time at which migration was performed and information regarding the range of migrated targets as migration information via the migration information management unit 208. An input/output control unit 209 performs display of a UI (User Interface) at the time of performing migration and performs notification to the document migration processing control unit 207 when input of a user operation is received via the UI. An example was described using the document management server 101 and the old document management server 103 of the present embodiment, in which the data migration source and migration destination are in the same environment, but the present invention is not limited to this, and a configuration is possible in which they are placed in separate environments. That is to say, the format of the database storing the document information and property information and the display content generated by the display content generation unit 204 may be different between the data migration source and the data migration destination.

Configuration of Client Apparatus

The client apparatus 102 is a personal computer, and in the present embodiment, it is configured by hardware such as a CPU, a RAM, a ROM, and HDD, and a network interface card (referred to below as "NIC"). The client apparatus 102 assumes the role of a terminal for communicating with the document management server 101 or the old document management server 103 via the network 104 and accessing stored document information. For example, the client apparatus 102 has a function of displaying data provided by the document management server 101 or the old document management server 103, storing obtained files in an arbitrary location, and viewing and editing the obtained files.

Document Management Structure

Figure 3:
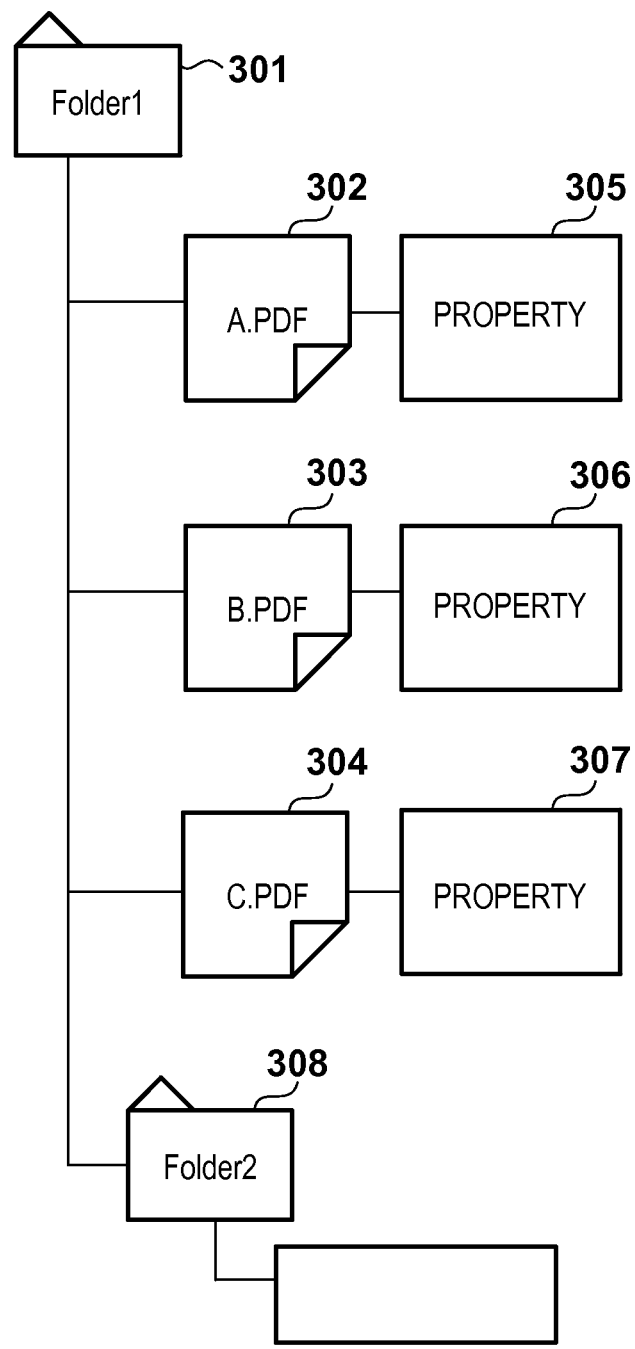
FIG. 3 is a diagram showing an illustration of folder/document management in a document management server.

FIG. 3 is a schematic diagram illustrating a theoretical structure for data managed on the document management server 101 and the old document management server 103. Note that in the present embodiment, it is assumed that the management systems of the databases of the document management server 101 and the old document management server 103 are different, and data migration is performed such that the theoretical folder hierarchy is in as similar a state as possible.

Document information is configured by a folder 301 that stores the document, and files 302 to 304 that are placed in the folder 301. Also, an example is shown here in which a folder 308 is furthermore stored in the folder 301. Properties 305 to 307 are associated with files 302 to 304 respectively. For example, the file 302 is associated with the property 305. The folder 301 is an element for configuring the theoretical hierarchy, and it can also be configured by multiple levels, as with folder 308. Each property expresses one or more property values stored for a corresponding file.

Data Format and Structure

Document Information

Next, with reference to FIG. 4, a data structure for realizing a theoretical structure for the documents shown in FIG. 3 will be described. FIG. 4 shows data structure at the time of managing documents that are to be handled by the document management server 101. Note that the information indicated below represents the minimum necessary amount of items used in the present embodiment and other items may be added as necessary.

In FIG. 4, the document information for each document is configured by a document ID 401, a document title 402, a file format 403, and a storage location 404. The information shown in FIG. 4 is managed as document information by the document information management unit 201. The document ID 401 is information for uniquely expressing pieces of document information, which are records. The document title 402 is information for expressing the display name of the document expressed by the document ID 401. The file format 403 is information expressing the extension of the document expressed by the document ID 401. The storage location 404 is information expressing the folder in the storage destination in which the document expressed by the document ID 401 is registered. Document information 405 to 407 shows records of a specific piece of document information and corresponds to the files 302 to 304 in FIG. 3.

Property Information

FIG. 5 shows the property information of the documents, and the property information is configured by a document ID 501, a property name 502, and a property value 503. The information shown in FIG. 5 is managed as property information by a property information management unit 202.

The document ID 501 corresponds to the document ID 401 for the document information shown in FIG. 4. The property name 502 indicates a property name for a property value associated with the document specified by the document ID 501. The property value 503 indicates a specific value for the property indicated by the property name 502. Property information 504 to 518 shown in FIG. 5 represents records of a specific piece of property information.

Migration Processing

A procedure of document migration processing in which a document stored in the old document management server 103 is moved (i.e., is subjected to data migration) to the document management server 101 will be described below with reference to FIGS. 6 to 11.

Figure 6:
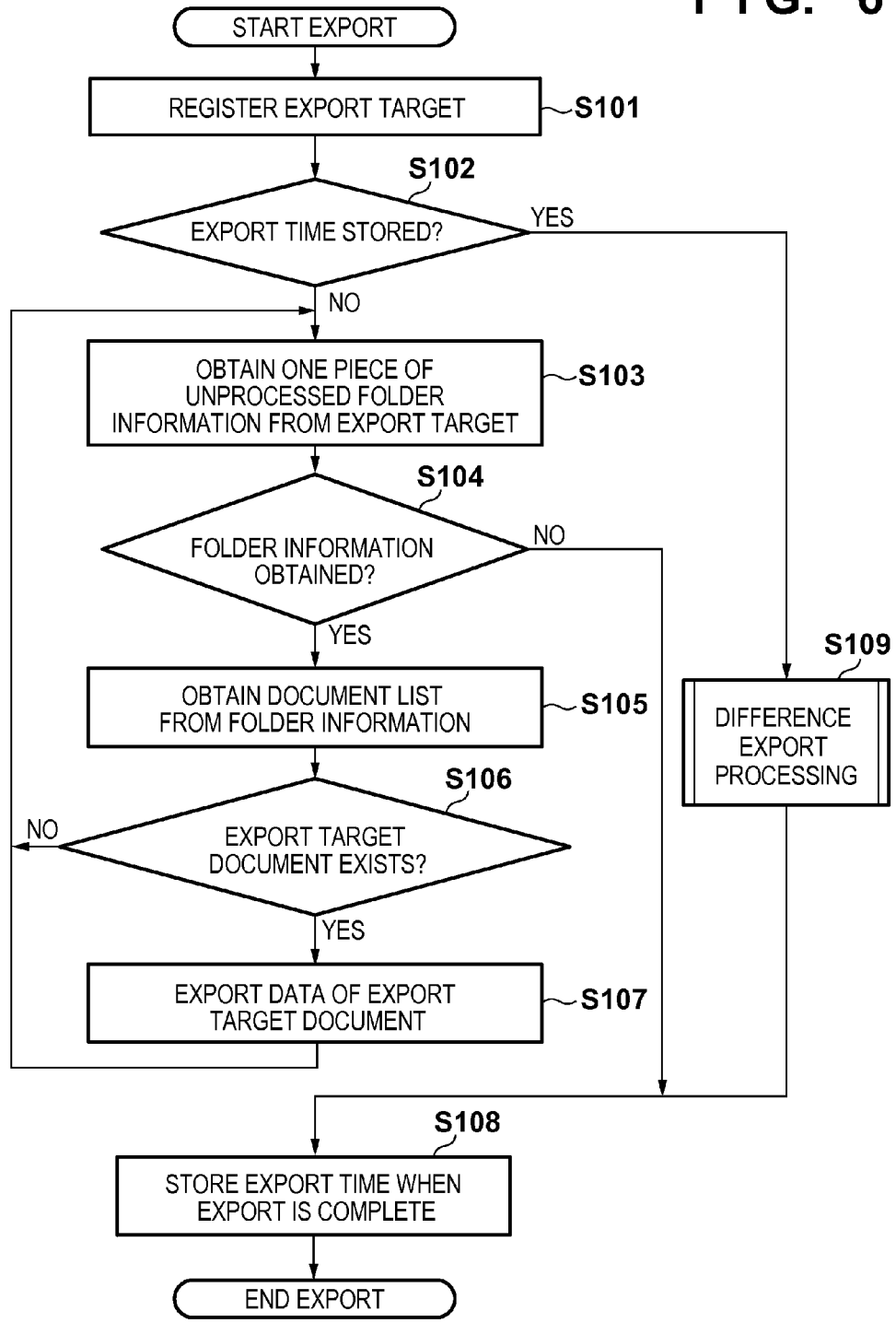
FIG. 6 is a diagram showing export processing according to an old document management server according to a first embodiment.
Figure 8:
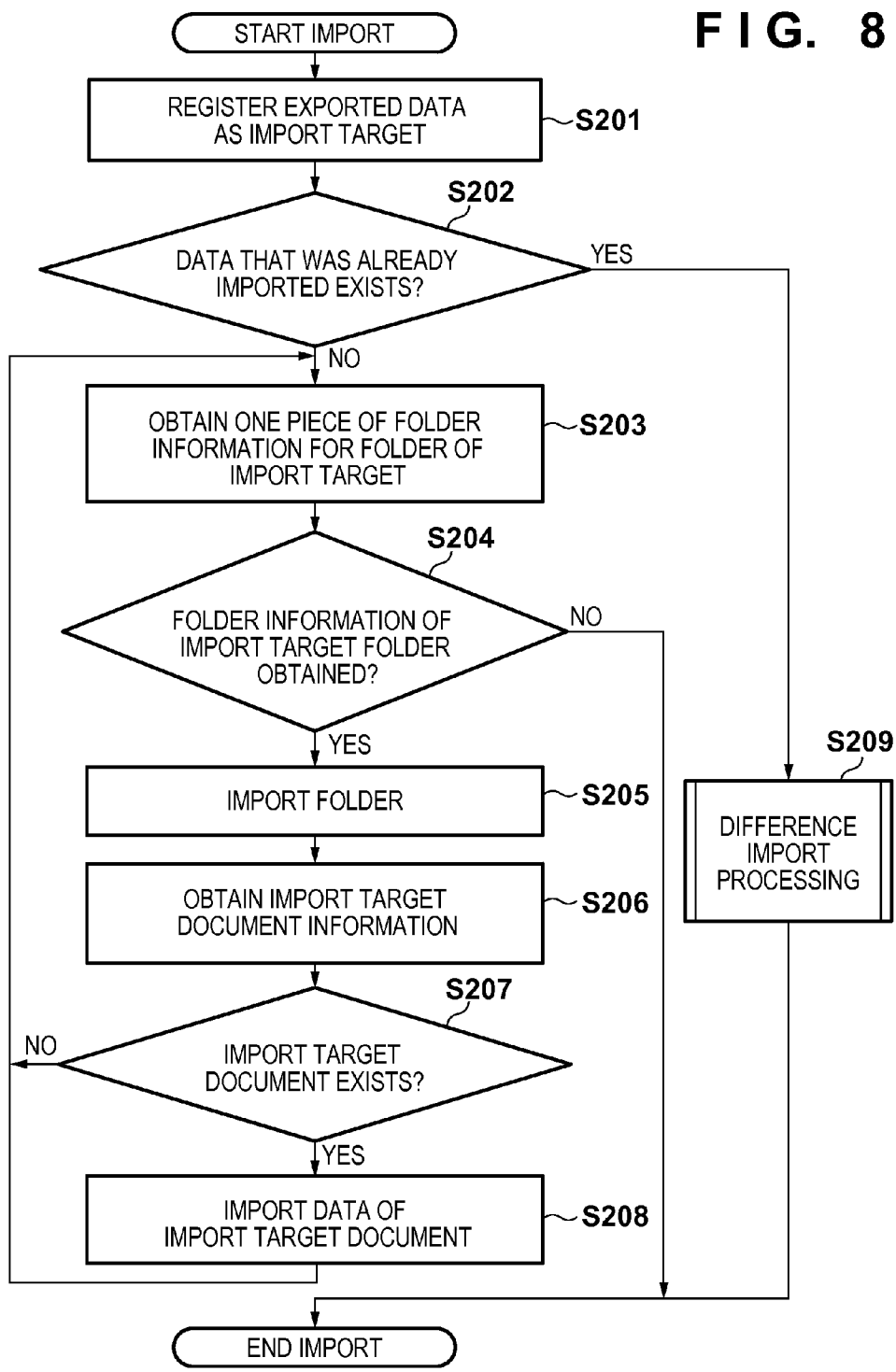
FIG. 8 is a diagram showing a procedure of import processing performed by a document management server according to the first embodiment.
Figure 9:
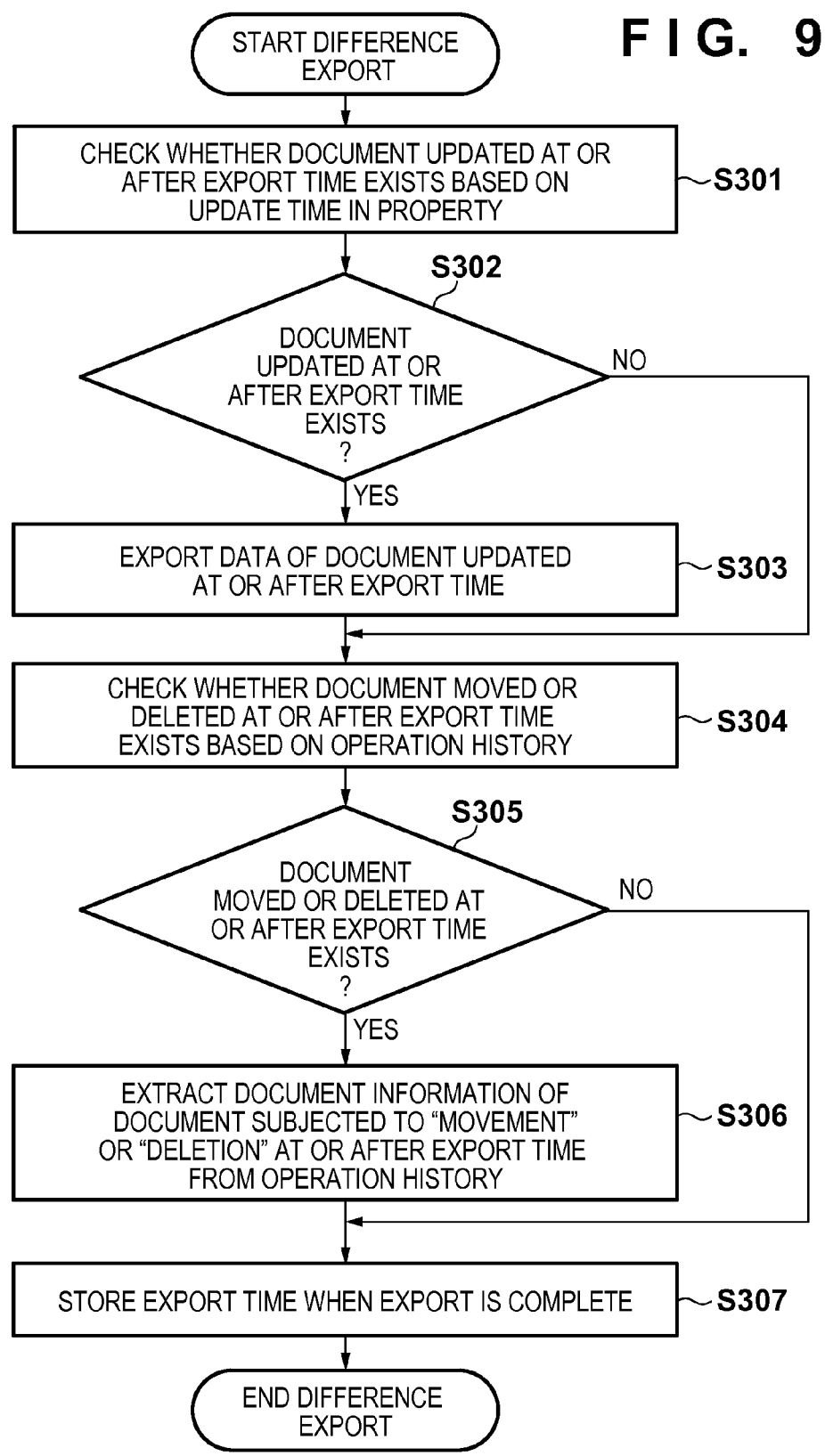
FIG. 9 is a diagram showing difference export processing performed by an old document management server according to the first embodiment.
Figure 11:
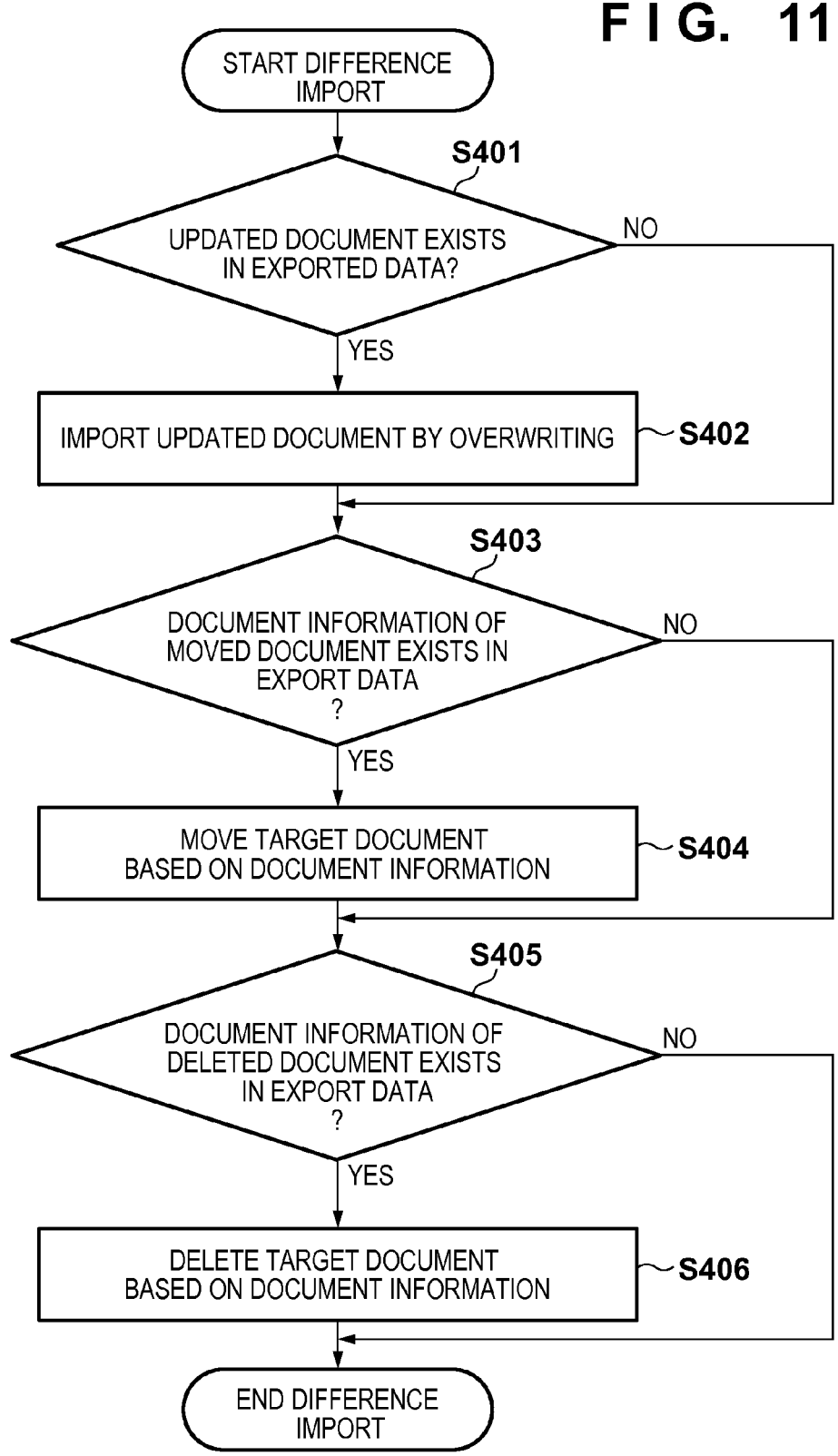
FIG. 11 is a diagram showing difference import processing performed by the document management server according to the first embodiment.

FIGS. 6 and 9 show data export processing in document migration processing. Also, FIGS. 8 and 11 show data import processing in the present document migration processing. Data migration is realized by importing data that has been exported from the old document management server 103 in the flow of FIGS. 6 and 9, to the document management server 101 in the flow of FIGS. 8 and 11. The present embodiment is characterized by the fact that based on the information regarding the "export time", the data to be exported is specified, and switching is performed between whether to perform data migration on all of the data, or to perform data migration on data that was updated after carrying out one instance of migration. Here, the information regarding the "export time" refers to time information recorded at the time of executing exporting, and is managed as migration information. The "export time" will be described in detail later.

Export Processing Performed by Old Document Management Server

A procedure of processing for exporting data stored in the old document management server 103 will be described next with reference to FIG. 6. The present processing is realized by the CPU of the old document management server 103 reading out a program stored in the storage unit to the RAM and executing it.

In step S101, the document migration processing control unit 207 of the old document management server 103 makes a request to the request processing control unit 205, obtains a list of folders that exist within the designated folder, and registers the folders included in the list as export targets.

In step S102, the document migration processing control unit 207 checks via the migration information management unit 208 whether or not an "export time" indicating that export processing has already been executed has been recorded. If the "export time" has not been recorded (NO in step S102), in step S103, the document migration processing control unit 207 obtains one piece of unprocessed folder information from among the folders that are export targets. For example, information regarding folder 301 shown in FIG. 3 is obtained.

In step S104, the document migration processing control unit 207 checks whether or not the folder information was obtained as the export target folder in step S103. If the export target folder was obtained (YES in step S104), in step S105, the document migration processing control unit 207 obtains a list of document information included in the folder. For example, if the folder 301 in FIG. 3 is the export target folder, the document information 405 to 407 shown in FIG. 4 is obtained as a list.

In step S106, the document migration processing control unit 207 checks whether or not an export target document exists based on the list of document information. If the target document exists (YES in step S106), in step S107, the document migration processing control unit 207 exports the actual data of the document and the document information obtained via the document information management unit 201. FIG. 7 is a diagram showing an example of a configuration of export data corresponding to document information that is to be exported. In the present example, an example is given in which the export data is data in an XML format (Extensible Markup Language), but the present invention is not limited to XML as long as a format capable of representing structure is used.

Export data 601 includes server information 602 that expresses information regarding the old document management server 103, which is the migration source, and document information 603 that expresses information regarding the folder, document, and property that were exported. The document information 603 includes information regarding which path (storage destination) the actual data of the document was output to. The document management server 101 uses the export data 601 and the actual data of the document when importing.

After exporting is completed in step S107, or in the case where no export target document exists in step S106, the procedure returns to step S103 and the document migration processing control unit 207 obtains the next unprocessed piece of folder information. For example, this corresponds to the folder 308 and the like. Thereafter, the document migration processing control unit 207 repeatedly executes steps S104 to S107 with respect to the obtained folder information, and when unprocessed folder information can no longer be obtained (NO in step S104), the procedure moves to step S108.

In step S108, when exporting is complete, the document migration processing control unit 207 records the "export time" via the migration information management unit 208 and stores it in the database. The "export time" is stored as migration information such as "2012/12/10 10:00", for example. Then, the present processing flow ends.

As described above, if the "export time" has not been recorded (NO in step S102) (i.e., if the present instance of exporting is the first instance), the document migration processing control unit 207 performs the processing of steps S101 to S107 and exports the document information of all of the folders. Note that difference export processing (step S109) that is performed in the case where the "export time" has been recorded (YES in step S102) will be described later with reference to FIG. 9.

Processing for Importing to Document Management Server

A procedure of processing for importing the data exported by the old document management server 103 to the document management server 101 will be described next with reference to FIG. 8. The present processing is realized by the CPU of the document management server 101 reading out a program stored in the storage unit to the RAM and executing it.

In step S201, the document migration processing control unit 207 of the document management server 101 obtains the export data exported by the old document management server 103 and registers it as import target data.

In step S202, the document migration processing control unit 207 checks via the document information management unit 201 whether or not data that has already been imported exists. If data that has already been imported does not exist (NO in step S202), in step S203, the document migration processing control unit 207 obtains the folder information of one unprocessed folder that is an import target from the data that was registered in step S201. Here, a case in which the imported data does not exist is, in other words, a state in which the current instance of import processing is the first instance thereof, and migrated data from the old document management server 103 does not exist in the document management server 101.

In step S204, the document migration processing control unit 207 checks whether or not the unprocessed folder information that is an import target was obtained in step S203. If import target folder information was obtained (YES in step S204), in step S205, the document migration processing control unit 207 imports the folder based on the obtained folder information via the request processing control unit 205.

In step S206, the document information of the documents stored in the folder that was imported in step S205 is obtained from the export data by the document migration processing control unit 207. In step S207, the document migration processing control unit 207 checks whether or not an import target document exists based on the obtained document information. If the import target document exists (YES in step S207), in step S208, the document migration processing control unit 207 imports the actual data of the target document. At that time, if the document information of multiple documents is included in the document information 603 of the export data 601, the document migration processing control unit 207 imports the actual data of the respective documents.

After importing is completed in step S208, or in the case where an import target document does not exist in step S207, the procedure returns to step S203, and the document migration processing control unit 207 obtains the next unprocessed folder information. Also, the document migration processing control unit 207 repeatedly executes steps S205 to S208 with respect to the obtained folder information, and when folder information can no longer be obtained (NO in step S204), import processing ends.

As described above, if data that has already been imported does not exist (i.e., if the current importing is the first instance of importing) (NO in step S202), the processing of steps S203 to S208 is repeated and the target folders and documents are imported. On the other hand, difference import processing (step S209) that is performed in the case where data that has already been imported exists (YES in step S202) will be described later with reference to FIG. 11.

Difference Export Processing Performed by Old Document Management Server

Next, a case in which the "export time" has already been recorded (i.e., the case of the second and subsequent instances of exporting) will be described. If there is a large amount of data when migrating data from the old document management server 103 to the document management server 101, migration processing takes time and the document management server 101 cannot be used during processing. Accordingly, in the present embodiment, it is assumed that the user uses the old document management server 103 during importing to the document management server 101. That is to say, a difference is generated between the data stored in the old document management server 103 at the time of starting exporting, and the data stored in the old document management server 103 at the time of ending importing to the document management server 101. In view of this, in the present embodiment, exporting from the old document management server 103 is once again performed after the first importing to the document management server 101 is completed.

If all of the data is once again exported from the old document management server 103 in order to migrate the data for this difference, needless migration time is generated, and therefore the following method is used in the present embodiment. Using the information regarding the time at which the previous instance of exporting was performed, only documents that have been subjected to updating processing at or subsequent to that time are exported, thus shortening the migration time. "Update processing" here refers to updating (including first-time registration), movement (changing the folder that is the storage location), or deletion of actual data content, for example. With reference given to FIG. 9, exporting of an updated document (referred to below as "difference exporting") will be described. The present processing corresponds to step S109 in FIG. 6.

In step S301, the document migration processing control unit 207 of the old document management server 103 checks whether or not a document whose actual data content has been updated at or subsequent to the "export time" exists by referring to the update time that is a piece of property information of the document. For example, if the "export time" that was stored during the first instance of exporting is "2012/12/10 10:00", the document migration processing control unit 207 compares that time and the update time in the property information held by the documents as shown in FIG. 5. Then, the document migration processing control unit 207 checks whether or not a document updated at or subsequent to the "export time" exists.

In step S302, as a result of the checking in step S301, the document migration processing control unit 207 determines whether or not a document whose actual data content has been updated at or subsequent to the time indicated by the "export time" exists. If a document that was updated at or subsequent to the "export time" exists (YES in step S302), in step S303, the document migration processing control unit 207 exports the actual data and the document information of the updated document. For example, based on the information indicated in FIG. 5, document C, whose document ID is "D003", is exported as a document updated at or subsequent to "2012/12/10 10:00". The exported data has a configuration similar to that of the export data 601 of FIG. 7, and the export data and actual data of the target document are output. Note that a document that is newly-registered at or subsequent to the "export time" has an update time property that is at or subsequent to the "export time", and therefore the document information and actual data of the newly-registered document are also exported in step S303.

In step S304, the document migration processing control unit 207 refers to the operation history of the documents so as to check whether or not a document exists whose actual data content has not been updated since the "export time" but has been moved or deleted. As shown in FIG. 10, the operation history includes an operation 701 that indicates the content of the operation, an operation date/time 702 that indicates the time of the operation, and a document ID 703 of the document that was subjected to the operation, and in step S304, the information included in the operation 701 is checked. The operation history here is generated accompanying an operation with respect to a document and is stored in the old document management server 103.

In step S305, the document migration processing control unit 207 checks whether or not a document that was moved or deleted at or subsequent to the "export time" in step S304 exists. If a document that was moved or deleted at or subsequent to the "export time" exists (YES in step S305), in step S306, the document migration processing control unit 207 exports the document information of the document that was moved or deleted at or subsequent to the "export time". For example, with the operation history shown in FIG. 10, document information of the documents whose document IDs are D004 and D005 is exported. Note that here, since the actual data of the documents (D004 and D005) has not been updated at or subsequent to the "export time", the actual data is not exported.

In step S307, after the difference exporting is completed, the document migration processing control unit 207 stores the "export time" using the migration information management unit 208. Then, the present processing flow ends.

Difference Import Processing Performed by Document Management Server

Next, a case in which data that has already been imported exists (i.e., the case of the second and subsequent instances of importing) will be described. Importing data that has been exported (updated document) according to the flow in FIG. 9 (referred to below as "difference importing") will be described below with reference to FIG. 11. The present processing corresponds to step S209 in FIG. 8.

In step S401, the document migration processing control unit 207 of the document management server 101 refers to the export data so as to check whether or not a document whose actual data has been updated (including newly-registered documents) exists. If an updated document exists (YES in step S401), in step S402, the document migration processing control unit 207 obtains the document information and the actual data that were exported in step S303. Here, if a document that has already been imported in step S208 of the first instance of import processing exists, the actual data of the document whose content has been updated is imported by overwriting. Also, the document information and actual data of a newly-registered document are imported as a new document.

In step S403, the document migration processing control unit 207 refers to the export data so as to check whether or not document information of a moved document exists. If the document information of a moved document exists (YES in step S403), in step S404, the document migration processing control unit 207 executes movement processing on the document registered in the document management server 101 based on the document information that was exported in step S306. Note that if multiple moved documents exist, the document migration processing control unit 207 executes movement processing on each document.

In step S405, the document migration processing control unit 207 references the export data so as to check whether or not document information of a deleted document exists. If the document information of the deleted document exists (YES in step S405), in step S406, the document migration processing control unit 207 executes deletion processing on the document registered in the document management server 101 based on the document information that was exported in step S306. Note that if multiple deleted documents exist, the document migration processing control unit 207 executes deletion processing on each document. Then, the present processing flow ends.

According to the above-described present embodiment, the export time and the information in the old document management server 103 (operation history and update time of the document managed by the old document management server 103) are used such that the updated data can be identified. That is to say, by directly comparing the data registered in the old document management server 103 and the data registered in the document management server 101, it is possible to perform data migration only on updated data without creating difference information.

Second Embodiment

A second embodiment for the document management system of the present invention will be described next. The second embodiment describes processing in the case where export processing is interrupted and restarted when export processing is being performed by the old document management server 103 of the first embodiment.

In a situation of performing data migration, it is possible for the export processing to be temporarily interrupted while the user uses the old document management server 103, and to be restarted thereafter. The present embodiment is characterized by the fact that even if the user uses the old document management server 103 during an interruption, documents that were subjected to an operation during the interruption can be included as migration targets. Here, only the differences from the first embodiment will be described, and the description of content that is redundant will be omitted.

Processing Flow

Export Processing Performed by Old Document Management Server

Figure 12:
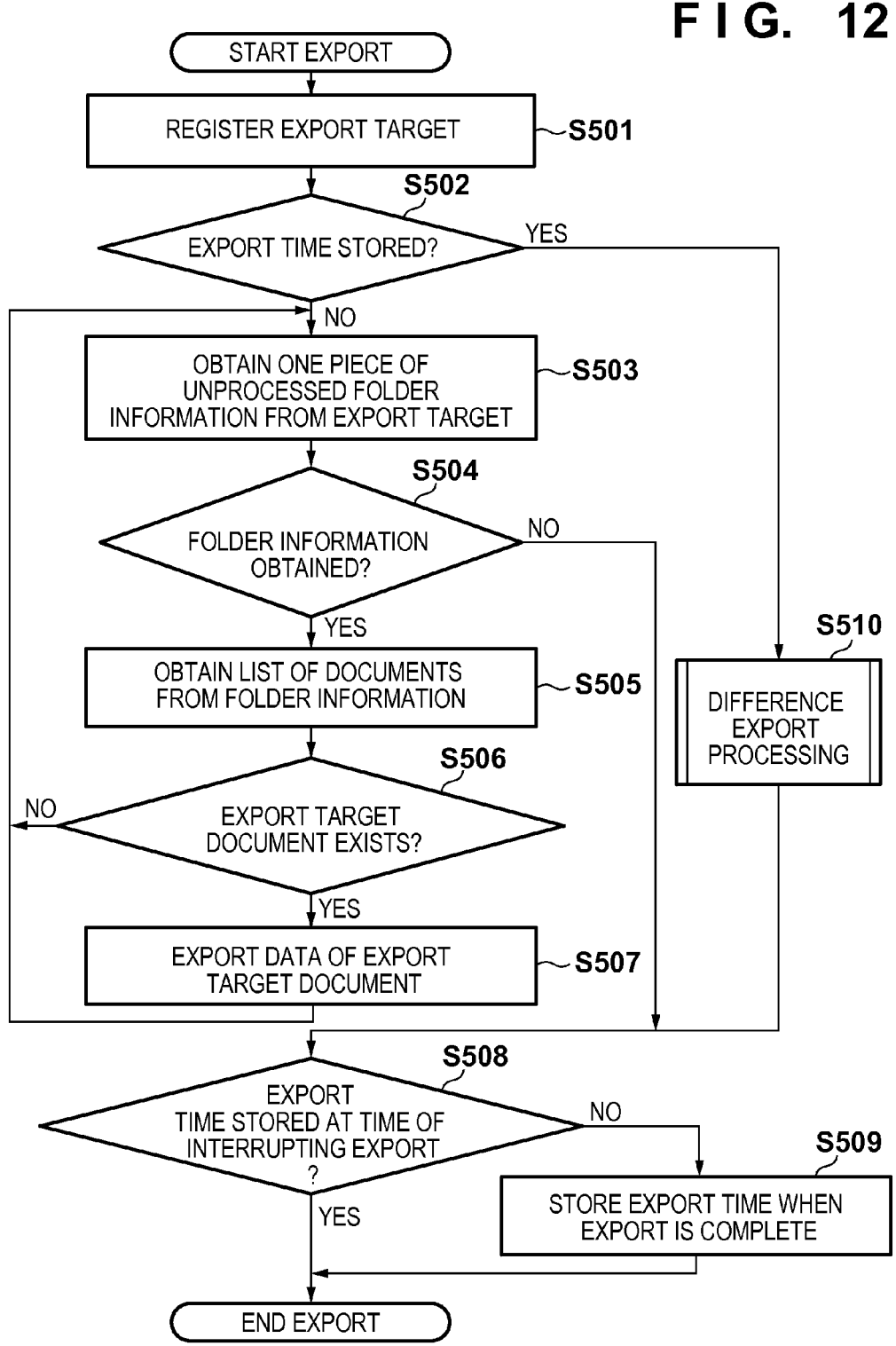
FIG. 12 is a diagram showing export processing by the old document management server according to a second embodiment.

Processing in the case of temporarily interrupting export processing will be described next. An export processing flow is shown in FIG. 12. The present processing is realized by the CPU of the old document management server 103 reading out a program stored in the storage unit to the RAM and executing it.

The processing of steps S501 to S507 and S510 is similar to that of the first embodiment.

If a command to interrupt export processing is received while steps S501 to S507 are being executed, the document migration processing control unit 207 of the old document management server 103 checks whether or not the "export time" has already been recorded and stored at the time of interrupting the exporting, although this is not shown in FIG. 12. If the "export time" has not been stored, the document migration processing control unit 207 stores the current time as the "export time". If the "export time" has already been stored at the previous instance of interrupting, the document migration processing control unit 207 performs interruption processing without storing the "export time". In other words, if a second or subsequent instance of interruption processing is instructed during export processing, the document migration processing control unit 207 performs interruption processing without storing the "export time".

After restarting the export processing, the document migration processing control unit 207 carries out steps S503 to S507 on the remaining folders and documents and executes them until exporting is complete unless interruption processing is instructed.

Also, in the case where the export processing is completed for all folders and the procedure moves to step S508, the document migration processing control unit 207 checks whether or not the "export time" has been stored at the time of interruption. If the "export time" has been stored according to the interruption of the export processing (YES in step S508), the present processing flow ends without recording the "export time" when export processing is complete. On the other hand, if the export processing was not interrupted and the "export time" according to the interruption is not recorded (NO in step S508), the document migration processing control unit 207 records and stores the "export time" when exporting is complete.

Subsequently, data import processing is performed on the document management server 101 side similarly to the case of the first embodiment, and at the time of difference exporting, exporting is performed with respect to documents updated at or subsequent to the "export time" that was stored at the first instance of interruption. Import processing, difference export processing, and difference import processing after exporting are similar to the case of the first embodiment.

With the second embodiment described above, documents updated at the time of interruption can be appropriately extracted and migrated as migration target documents by storing the "export time" only at the first incident of interruption.

Third Embodiment

A third embodiment for the document management system of the present invention will be described below. In the present embodiment, an "access history" is used rather than the "export time" when migration processing is performed by the old document management server 103. The present embodiment is characterized by the fact that a document that was used recently by the old document management server 103 (a document with a recent access time), or a document that is frequently used (a document with a high access frequency) is migrated with priority. According to this, even at a time when migration is not complete, the user can have all of the needed data on the document management server 101 and although the overall migration time does not change, the migration time for documents whose data migration is to be prioritized can be shortened. Here, only the differences from the first embodiment will be described, and the description of content that is redundant will be omitted.

Processing Flow

Export Processing Performed by Old Document Management Server

Figure 13:
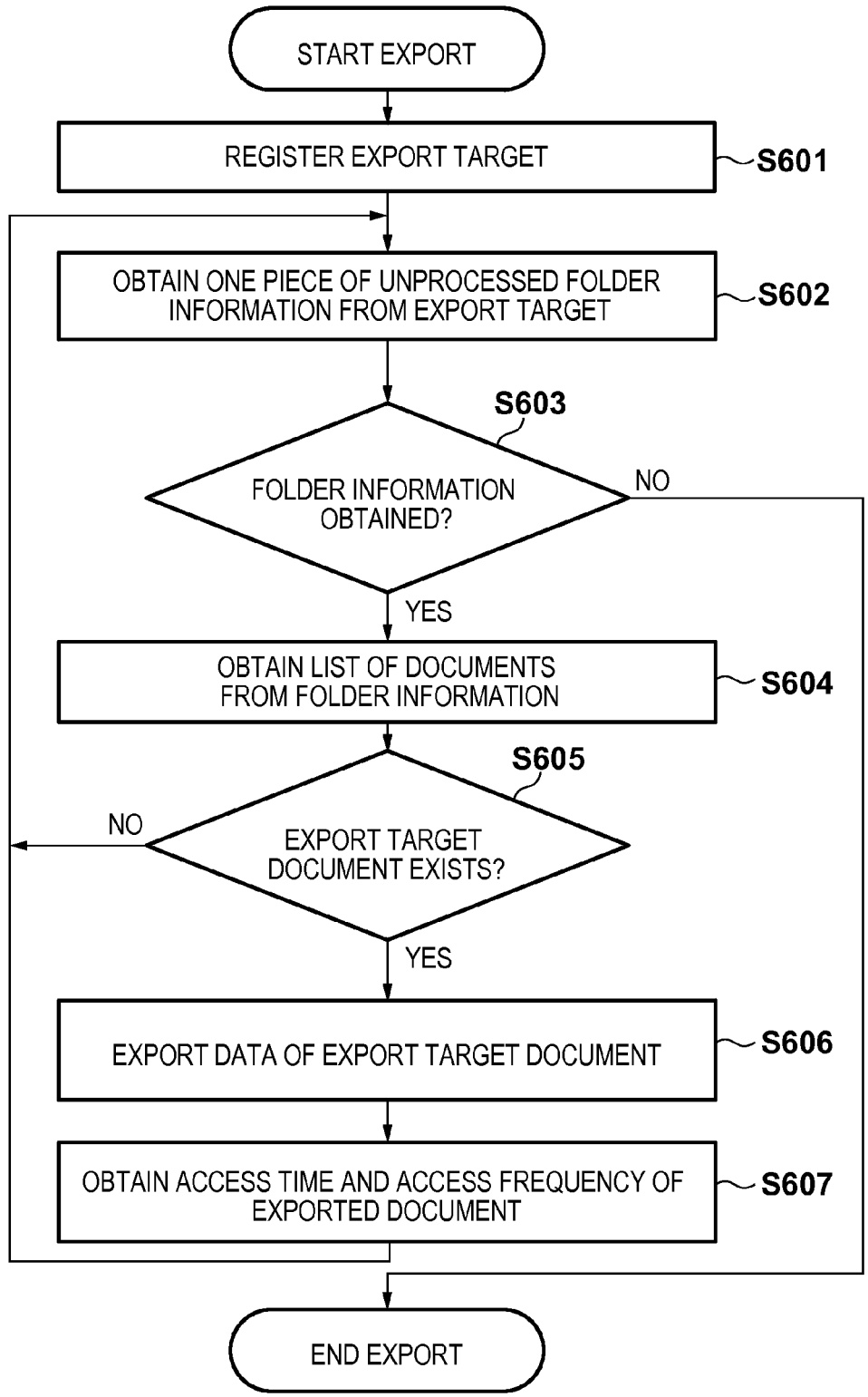
FIG. 13 is a diagram showing export processing performed by the old document management server according to a third embodiment.

Export processing for exporting with the inclusion of information regarding the access time and the access frequency will be described next. A flow of export processing is shown in FIG. 13. The present processing is realized by the CPU of the old document management server 103 reading out a program stored in the storage unit to the RAM and executing it.

In step S601, the document migration processing control unit 207 of the old document management server 103 obtains a list of folders that exist within the designated folder via the request processing control unit 205 and registers the folders included in the list as export targets. In step S602, the document migration processing control unit 207 obtains the folder information of one of the unprocessed folders out of the export targets. For example, the information of folder 301 shown in FIG. 3 is obtained.

In step S603, the document migration processing control unit 207 determines whether or not folder information was obtained in step S602 as an export target folder. If export target folder information was obtained (YES in step S603), in step S604, the document migration processing control unit 207 obtains a list of document information included in the obtained folder. For example, this corresponds to the document information 405 to 407 shown in FIG. 4.

In step S605, the document migration processing control unit 207 determines whether or not an export target document exists based on the list of document information. If an export target document exists (YES in step S605), in step S606, the document migration processing control unit 207 exports the document information and actual data of the document that was obtained via the document information management unit 201. The export data is configured as shown in FIG. 7, similarly to the first embodiment.

In step S607, the document migration processing control unit 207 obtains the access time and access frequency of the document that was exported in step S606. The document migration processing control unit 207 obtains the access time from the property information via the property information management unit 202. For the access frequency, the access count of the target document is obtained by referring to viewing operations based on the operation history shown in FIG. 10, which was described in the first embodiment. Then, a document with a high access count is handled as a document with a high frequency and a high priority. These pieces of information are output to the document information 603 of the export data shown in FIG. 7. Note that the priority level is defined not only for the document, and for example, the priority level of the folder may be determined based on the priority levels of all of the documents stored therein. That is to say, since there are cases where the respective access frequencies of documents stored in a folder are small but the folder storing the documents has a high access count due to the access frequencies of the respective documents stored therein being accumulated, the priority level of such a folder may be raised.

Thereafter, the procedure returns to step S602 and the document migration processing control unit 207 obtains the next piece of folder information. For example, the information of folder 308 is obtained. Also, the document migration processing control unit 207 repeatedly executes steps S603 to S607 on the obtained folder information, and when folder information can no longer be obtained (NO in step S603), export processing ends.

Import Processing Performed by Document Management Server

Figure 14:
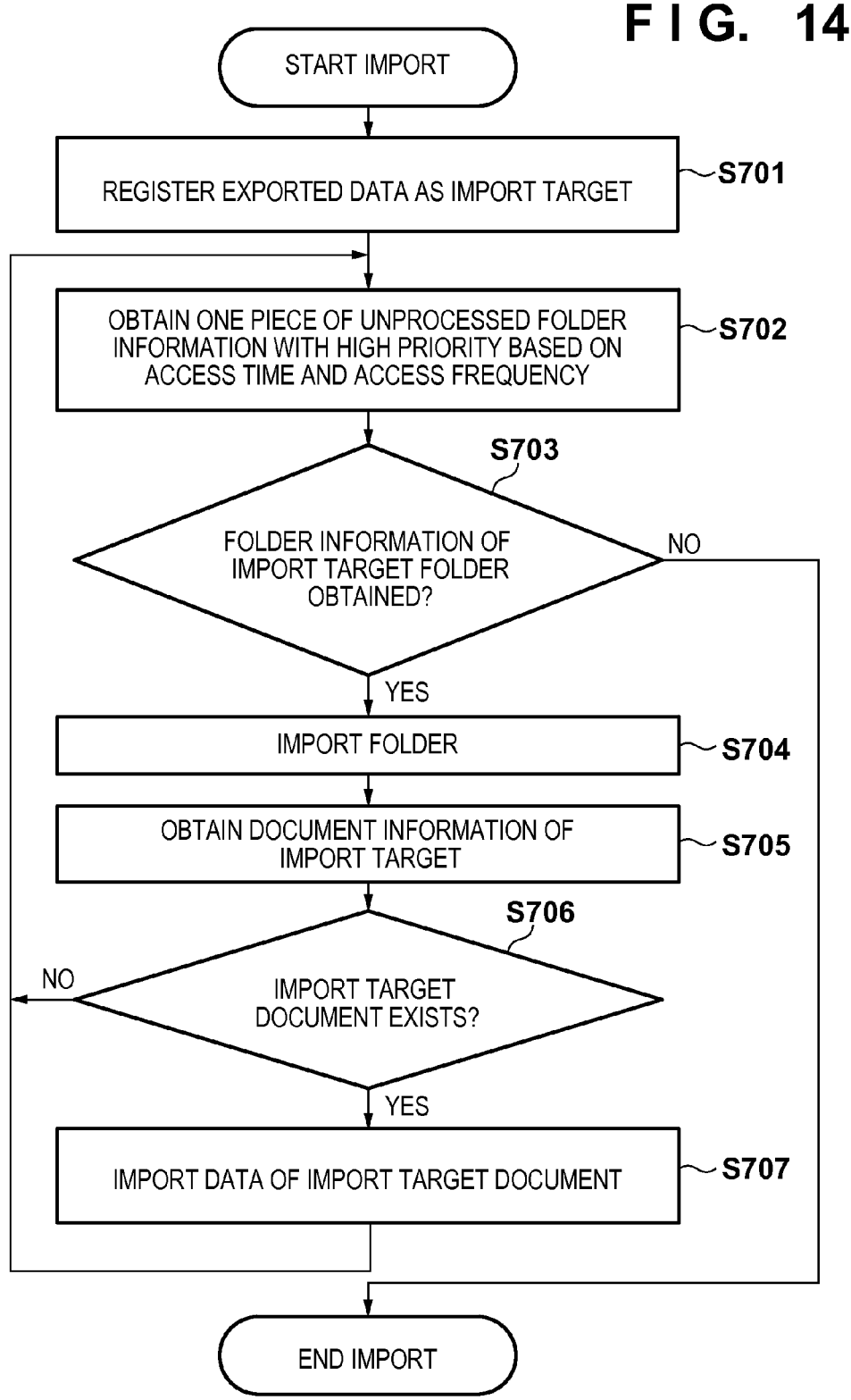
FIG. 14 is a diagram showing import processing performed by the document management server according to the third embodiment.

A procedure of processing for importing the data exported by the old document management server 103 to the document management server 101 will be described next with reference to FIG. 14. The present processing is realized by the CPU of the document management server 101 reading out a program stored in the storage unit to the RAM and executing it.

In step S701, the document migration processing control unit 207 of the document management server 101 obtains the export data exported by the old document management server 103 and registers it as an import target. In step S702, out of the document information for the data registered in step S701, the document migration processing control unit 207 obtains one piece of folder information for an unprocessed folder that includes a document with a high access frequency, or a document with a recent access time. Here, the document migration processing control unit 207 first obtains a folder including a document with a high access frequency with priority, and then obtains a folder including a document with a recent access time with priority. Here, a threshold value for the frequency or the time difference between the access time and the current time may be provided, and priority may be decided based on the difference between the threshold value and the information indicated in the export data. For example, letting the threshold value for the access frequency be 10 instances, a folder including a document that has been accessed with a frequency that exceeds that threshold value may be treated as having the highest priority.

In step S703, the document migration processing control unit 207 determines whether or not an import target folder was obtained in step S702. If the folder information of an import target folder was obtained (YES in step S703), in step S704, the document migration processing control unit 207 imports the obtained folder via the request processing control unit 205. In step S705, the document information of a document stored in the folder that was imported in step S704 is obtained from the export data by the document migration processing control unit 207.

In step S706, the document migration processing control unit 207 determines whether or not an import target document exists based on the obtained document information. If the import target document exists (YES in step S706), in step S707, the document migration processing control unit 207 imports the actual data of the target document. Note that if the document information of multiple documents has been output in the document information 603 in the export data, the document migration processing control unit 207 imports each document.

Thereafter, the procedure returns to step S702 and the document migration processing control unit 207 obtains the next piece of folder information for an unprocessed folder. Subsequently, the document migration processing control unit 207 repeatedly executes steps S703 to S707 on the obtained folder information, and when folder information can no longer be obtained (NO in step S703), import processing ends.

According to the above-described present embodiment, it is possible to perform migration using documents with a high access frequency or documents with a recent access time, and thus the migration time for documents used often by the user can be shortened.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-154960, filed Jul. 25, 2013, which is hereby incorporated by reference herein in its entirety.

What is claimed is:

1. A system in which data stored in a first information processing apparatus is migrated to a second information processing apparatus,
wherein a client apparatus is capable of updating the data stored in a first database of the first information processing apparatus by requesting to the first information processing apparatus,
wherein the first information processing apparatus comprises:
a memory storing first instructions; and
a processor which is capable of executing the first instructions causing the information processing apparatus to:
export migration target data that is stored in the first database;
store an operation history for the data; and
record time information indicating a time of exporting performed at each time when migration target data is exported,
wherein all of the data stored in the first database is exported, if the time information is not recorded,
wherein the second information processing apparatus comprises:
a memory storing second instructions; and
a processor which is capable of executing the second instructions causing the second information processing apparatus to:
perform an import process for importing the exported data into a second database comprised of a management system which is different from a management system of the first database,
wherein, during the import process, the client apparatus is capable of updating the data stored in the first database, not the second database, by requesting to the first information processing apparatus,
wherein, if the time information is recorded and the data stored in the first database has been updated during the import process, the time information and information regarding an update date of the data stored in the first database are compared and data updated at the time indicated by the time information or subsequent to the time indicated by the time information, of the data stored in the first database, is exported as difference data of migration target,
wherein an import process for importing the difference data into the second database is performed,
wherein information regarding data that has been subjected to at least one of movement and deletion at the time indicated by the time information or subsequent to the time indicated by the time information is exported,
wherein, if an update with respect to the data is an update of actual data, the updated actual data and property information of the data are exported,
wherein, if an update with respect to the data is deletion or movement, the property information of the data is exported, and
wherein the time information and the operation history are further compared and information regarding data that has been subjected to at least one of movement and deletion at or subsequent to the time indicated by the time information is exported.

2. The system according to claim 1, wherein the time of completing exporting is recorded as the time information.

3. The system according to claim 1, wherein, in a case where an interruption of export processing is instructed while export processing is being performed, the time at a first instance of interruption is recorded as the time information, and the time is not recorded when export processing is restarted and completed, or at a second or subsequent instance of interruption.

4. The system according to claim 1, wherein all of data exported is imported, if no data that has been migrated from the first database to the second database exists, and
data that has not been migrated to the second database of the exported data is imported, if data that has been migrated from the first database to the second database exists.

5. An information processing apparatus, comprising:
a memory storing first instructions; and
a processor which is capable of executing the first instructions causing the information processing apparatus to:
export migration target data that is stored in a database;
store an operation history for the data; and record time information indicating a time of exporting performed at each time when migrated target data is exported, wherein all of the data stored in the database is exported, if the time information is not recorded, wherein, if the time information is recorded and the data stored in the database has been updated during an import process for importing data exported by an external apparatus, the time information and information regarding an update date of the data stored in the database are compared and data updated at the time indicated by the time information or subsequent to the time indicated by the time information, of the data stored in the database, is exported as difference data of migration target, wherein information regarding data that has been subjected to at least one of movement and deletion at the time indicated by the time information or subsequent to the time indicated by the time information is exported, wherein, if an update with respect to the data is an update of actual data, updated actual data and property information of the data are exported, wherein, if an update with respect to the data is deletion or movement, the property information of the data is exported, and wherein the time information and the operation history are further compared and information regarding data that has been subjected to at least one of movement and deletion at or subsequent to the time indicated by the time information is exported.

6. A method for controlling an information processing apparatus, the method comprising:

exporting migration target data that is stored in a database;

storing an operation history for the data; and recording time information indicating a time at which exporting was performed at each time when the migration target data is exported, wherein all of the data stored in the database is exported, if the time information is not recorded, wherein if the time information is recorded and the data stored in the database has been updated during an import process for importing data exported by an external apparatus, the time information and information regarding an update date of the data stored in the database are compared, and data that was updated at the time indicated by the time information or subsequent to the time indicated by the time information, of the data stored in the database, is exported as difference data of migration target, wherein information regarding data that has been subjected to at least one of movement and deletion at the time indicated by the time information or subsequent to the time indicated by the time information is exported, wherein if an update with respect to the data is an update of actual data, the updates actual data and property information of the data are exported, wherein if an update with respect to the data is deletion or movement, the property information of the data is exported, and wherein the time information and the operation history are further compared and information regarding data that has been subjected to at least one of movement and deletion at or subsequent to the time indicated by the time information is exported.

7. A non-transitory computer-readable medium storing a program for causing a computer to:

export migration target data that is stored in a database;

store an operation history for the data; and record time information indicating a time of exporting performed at each time when migrated target data is exported, wherein all of the data stored in the database is exported, if the time information is not recorded, wherein, if the time information is recorded and the data stored in the database has been updated during an import process for importing data exported by an external apparatus, the time information and information regarding an update date of the data stored in the database are compared, and data updated at the time indicated by the time information or subsequent to the time indicated by the time information, of the data stored in the database, is exported as difference data of migration target, wherein information regarding data that has been subjected to at least one of movement and deletion at the time indicated by the time information or subsequent to the time indicated by the time information is exported, wherein, if an update with respect to the data is an update of actual data, the updated actual data and property information of the data are exported, wherein, if an update with respect to the data is deletion or movement, the property information of the data is exported, and wherein the time information and the operation history are further compared and information regarding data that has been subjected to at least one of movement and deletion at or subsequent to the time indicated by the time information is exported.

8. A system in which data stored in a first information processing apparatus is migrated to a second information processing apparatus, wherein a client apparatus is capable of updating the data stored in a first database of the first information processing apparatus by requesting to the first information processing apparatus, wherein the first information processing apparatus comprises:

a memory storing first instructions; and a processor which is capable of executing the first instructions causing the information processing apparatus to:

export migration target data that is stored in the first database;

store an operation history for the data; and record time information indicating a time of exporting performed at each time when migration target data is exported, wherein all of the data stored in the first database is exported, if the time information is not recorded, wherein the second information processing apparatus comprises:

a memory storing second instructions; and a processor which is capable of executing the second instructions causing the second information processing apparatus to:

perform an import process for importing the exported data into a second database comprised of a management system which is different from a management system of the first database, wherein, during the import process, the client apparatus is capable of updating the data stored in the first database, not the second database, by requesting to the first information processing apparatus, wherein, if the time information is recorded and the data stored in the first database has been updated during the import process, data updated at the time indicated by the time information or subsequent to the time indicated by the time information, of the data stored in the first database, is exported as difference data of migration target, wherein an import process for importing the difference data into the second database is performed, wherein information regarding data that has been subjected to at least one of movement and deletion at the time indicated by the time information or subsequent to the time indicated by the time information is exported, wherein, if an update with respect to the data is an update of actual data, the updated actual data and property information of the data are exported, wherein, if an update with respect to the data is deletion or movement, the property information of the data is exported, and wherein the time information and the operation history are compared and information regarding data that has been subjected to at least one of movement and deletion at or subsequent to the time indicated by the time information is exported.

* * * * *